(12) United States Patent
Nguyen et al.

(10) Patent No.: US 12,642,632 B2
(45) Date of Patent: *Jun. 2, 2026

(54) INTRAORAL DEVICE

(71) Applicant: SOLMETEX, LLC, Northborough, MA (US)

(72) Inventors: Thien Nguyen, Santa Ana, CA (US); Tam Thanh Pham, San Francisco, CA (US)

(73) Assignee: Solmetex, LLC, Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,097

(22) Filed: May 30, 2024

(65) Prior Publication Data

US 2024/0398527 A1 Dec. 5, 2024

Related U.S. Application Data

(63) Continuation of application No. 18/217,304, filed on Jun. 30, 2023, now Pat. No. 12,011,329, which is a (Continued)

(51) Int. Cl.
*A61C 17/02* (2006.01)
*A61C 17/08* (2006.01)

(52) U.S. Cl.
CPC .......... *A61C 17/0208* (2013.01); *A61C 17/08* (2019.05)

(58) Field of Classification Search
CPC ..... A61C 17/0208; A61C 17/08; A61C 17/07; A61C 17/00; A61C 17/06
(Continued)

(56) References Cited

U.S. PATENT DOCUMENTS

| | | | |
|---|---|---|---|
| 50,461 | A | 10/1865 | Dibble |
| 1,471,207 | A | 10/1923 | Napoleon |

(Continued)

FOREIGN PATENT DOCUMENTS

| | | |
|---|---|---|
| AU | 2014202637 | 5/2014 |
| AU | 2016200275 | 5/2014 |

(Continued)

OTHER PUBLICATIONS

Nguyen; Thien, Intraoral Device, Claims, US 20240423768 A1 (Year: 2024).*

(Continued)

*Primary Examiner* — Eric J Rosen
*Assistant Examiner* — Mirayda A Aponte
(74) *Attorney, Agent, or Firm* — Polsinelli LLP

(57) ABSTRACT

A dental mouthpiece is provided that may be attached to a high-suction dental adapter for the purpose of assisting the dental staff during dental procedures through chair-side, hands-free suction, and isolation. Such a mouthpiece may include a main body portion, a cheek retractor portion, and a suction connector portion. In some embodiments, the main body portion, cheek retractor portion, and suction connector portion (and sub-portions thereof) may be molded in one piece, preferably by injection molding. In an exemplary embodiment, the mouthpiece may be made of a material that is flexible, translucent, conducive to injection molding, high heat-resistant, and autoclavable. Such a material may include silicone. Because the mouthpiece may be made of a high heat-resistant and autoclavable material, such a mouthpiece may be reusable.

20 Claims, 11 Drawing Sheets

Related U.S. Application Data continuation of application No. 14/228,057, filed on Mar. 27, 2014, now Pat. No. 11,744,686, which is a continuation of application No. 14/100,323, filed on Dec. 9, 2013, now Pat. No. 8,911,232.

(60) Provisional application No. 61/734,939, filed on Dec. 7, 2012.

(58) Field of Classification Search
USPC .......................................................... 433/92
See application file for complete search history.

(56) References Cited

U.S. PATENT DOCUMENTS

| | | | |
|---|---|---|---|
| 1,731,322 A | 10/1929 | Riddle |
| 2,019,612 A | 11/1935 | Langhans et al. |
| 2,937,445 A | 5/1960 | Erickson |
| 3,090,122 A | 5/1963 | Erickson |
| 3,101,543 A | 8/1963 | Baughan |
| 3,247,844 A | 4/1966 | Berghash |
| 3,379,192 A | 4/1968 | Warren |
| 3,453,735 A | 7/1969 | Burt |
| 3,489,141 A | 1/1970 | Warren |
| 3,516,160 A | 6/1970 | Leffler |
| 3,758,950 A | 9/1973 | Krouzian |
| 3,768,477 A | 10/1973 | Anders et al. |
| 3,802,081 A | 4/1974 | Rogers |
| 3,857,181 A | 12/1974 | Rappaport |
| 3,877,691 A | 4/1975 | Foster |
| 3,924,333 A | 12/1975 | Erickson |
| 4,017,975 A | 4/1977 | Johnson |
| 4,024,642 A | 5/1977 | Zorovich |
| 4,083,115 A | 4/1978 | McKelvey |
| 4,167,814 A | 9/1979 | Schubert |
| 4,192,071 A | 3/1980 | Erickson |
| 4,237,574 A | 12/1980 | Kelly et al. |
| D267,586 S | 1/1983 | Hatlen |
| 4,425,911 A | 1/1984 | Luomanen |
| 4,511,329 A | 4/1985 | Diamond |
| 4,718,662 A | 1/1988 | North |
| 4,802,851 A | 2/1989 | Rhoades |
| 4,822,278 A | 4/1989 | Oliva et al. |
| 4,975,057 A | 12/1990 | Dyfvermark |
| D315,955 S | 4/1991 | Mann |
| 5,009,595 A | 4/1991 | Osborn |
| 5,037,298 A | 8/1991 | Hickham |
| 5,078,602 A | 1/1992 | Honoshofsky |
| 5,365,624 A | 11/1994 | Berns |
| 5,460,524 A | 10/1995 | Anderson |
| D364,456 S | 11/1995 | Solnit |
| 5,516,286 A | 5/1996 | Kushner |
| D372,096 S | 7/1996 | Frush |
| 5,588,836 A | 12/1996 | Landis et al. |
| 5,720,275 A | 2/1998 | Patil et al. |
| 5,730,599 A | 3/1998 | Pak |
| 5,762,496 A | 6/1998 | Albertsson et al. |
| 5,890,899 A | 4/1999 | Sclafani |
| 6,022,214 A | 2/2000 | Hirsch et al. |
| 6,213,772 B1 | 4/2001 | Costello |
| 6,223,376 B1 | 5/2001 | Lee |
| 6,241,521 B1 | 6/2001 | Garrison |
| 6,267,591 B1 | 7/2001 | Barstow |
| 6,338,627 B2 | 1/2002 | Hirsch et al. |
| 6,575,746 B2 | 6/2003 | Hirsch et al. |
| 6,652,276 B2 | 11/2003 | Fischer et al. |
| 6,655,960 B2 | 12/2003 | Fischer |
| 6,672,305 B2 | 1/2004 | Parker |
| 6,716,029 B2 | 4/2004 | Fischer et al. |
| D495,799 S | 9/2004 | Hirsch et al. |
| D497,426 S | 10/2004 | Hirsch et al. |
| 6,908,308 B2 | 6/2005 | Hirsch et al. |
| 6,974,321 B2 | 12/2005 | Hirsch et al. |
| 7,287,981 B2 | 10/2007 | Hirsch |
| 7,293,990 B2 | 11/2007 | Hirsch et al. |
| D565,186 S | 3/2008 | Huffman |
| 7,611,354 B2 | 11/2009 | Hirsch et al. |
| D615,203 S | 5/2010 | Hirsch et al. |
| 7,748,981 B2 | 7/2010 | Hirsch et al. |
| 8,029,280 B2 | 10/2011 | Black et al. |
| 8,057,227 B2 | 11/2011 | Hirsch et al. |
| 8,057,228 B2 | 11/2011 | Hirsch et al. |
| 8,075,310 B2 | 12/2011 | Hirsch et al. |
| D663,831 S | 7/2012 | Sidhu |
| 8,241,035 B2 | 8/2012 | Jones et al. |
| D666,726 S | 9/2012 | Davis et al. |
| 8,297,973 B2 | 10/2012 | Hirsch et al. |
| D686,327 S | 7/2013 | Marumori |
| 8,529,256 B2 | 9/2013 | Hirsch et al. |
| 8,535,056 B2 | 9/2013 | Dragan et al. |
| D696,779 S | 12/2013 | Hirsch et al. |
| D706,937 S | 6/2014 | Suga |
| 8,745,802 B2 | 6/2014 | Steur |
| 8,911,232 B2 | 12/2014 | Nguyen |
| D728,108 S | 4/2015 | Coreil |
| D734,851 S | 7/2015 | Nguyen |
| 9,084,656 B2 | 7/2015 | Hirsch |
| 9,089,389 B2 | 7/2015 | Hirsch et al. |
| D735,858 S | 8/2015 | Hirsch et al. |
| D737,964 S | 9/2015 | Jessop et al. |
| D749,716 S | 2/2016 | Holmgren |
| 9,358,086 B2 | 6/2016 | Hirsch |
| 9,526,597 B2 | 12/2016 | Steur |
| 9,532,858 B2 | 1/2017 | Hirsch |
| D782,047 S | 3/2017 | Ritter |
| D782,048 S | 3/2017 | Ritter |
| D787,069 S | 5/2017 | Ritter |
| D787,070 S | 5/2017 | Ritter |
| D790,712 S | 6/2017 | Walls |
| 9,788,924 B2 | 10/2017 | Nguyen |
| 9,848,959 B2 | 12/2017 | Lowe |
| D809,660 S | 2/2018 | Nguyen et al. |
| 9,968,341 B2 | 5/2018 | Ritter |
| D833,029 S | 11/2018 | Guenst et al. |
| 10,390,734 B2 | 8/2019 | Johnson et al. |
| 10,390,916 B1 | 8/2019 | Rassibi |
| D868,958 S | 12/2019 | Reyes |
| D876,627 S | 2/2020 | Nguyen et al. |
| 10,575,976 B2 | 3/2020 | Bardach et al. |
| D903,096 S | 11/2020 | Hotinsky |
| 10,869,541 B2 | 12/2020 | Pai et al. |
| 10,939,979 B2 | 3/2021 | Lombardi |
| 10,945,593 B1 | 3/2021 | Packouz et al. |
| D923,796 S | 6/2021 | Mukherji |
| 11,160,644 B2 | 11/2021 | Glen et al. |
| 11,191,624 B2 | 12/2021 | Van Dijk |
| D957,646 S | 7/2022 | Leonhardt |
| D962,438 S | 8/2022 | Nguyen et al. |
| D962,439 S | 8/2022 | Nguyen et al. |
| 11,576,764 B2 | 2/2023 | Nguyen |
| 11,589,969 B2 | 2/2023 | Nguyen |
| 11,589,970 B2 | 2/2023 | Nguyen et al. |
| 11,737,739 B2 | 8/2023 | Ritter |
| 11,744,686 B2 | 9/2023 | Nguyen et al. |
| 11,793,617 B2 | 10/2023 | Cao et al. |
| 11,826,217 B2 | 11/2023 | Nguyen et al. |
| 12,011,329 B2 | 6/2024 | Nguyen et al. |
| D1,033,650 S | 7/2024 | Nguyen et al. |
| D1,037,436 S | 7/2024 | Nguyen et al. |
| D1,048,380 S | 10/2024 | Fang |
| 12,167,948 B2 | 12/2024 | Nguyen et al. |
| 12,290,418 B2 | 5/2025 | Nguyen et al. |
| D1,084,352 S | 7/2025 | McCarthy |
| D1,091,807 S | 9/2025 | Nguyen et al. |
| D1,097,158 S | 10/2025 | Ritter |
| 2001/0008752 A1 | 7/2001 | Hirsch et al. |
| 2002/0082544 A1 | 6/2002 | Thrash et al. |
| 2003/0134253 A1 | 7/2003 | Hirsch et al. |
| 2004/0033468 A1 | 2/2004 | Fischer et al. |
| 2005/0214713 A1 | 9/2005 | O'Neill |
| 2006/0063126 A1 | 3/2006 | Aloise et al. |
| 2006/0063129 A1 | 3/2006 | Hirsch |
| 2006/0084031 A1 | 4/2006 | Hirsch et al. |
| 2008/0166684 A1 | 7/2008 | Kanas |

(56) References Cited

U.S. PATENT DOCUMENTS

| | | |
|---|---|---|
| 2008/0318183 A1 | 12/2008 | Suzman |
| 2009/0117506 A1 | 5/2009 | Igari |
| 2009/0123886 A1 | 5/2009 | Vaska |
| 2009/0208898 A1 | 8/2009 | Kaplan |
| 2009/0274991 A1 | 11/2009 | Black et al. |
| 2010/0062397 A1 | 3/2010 | Brewer |
| 2011/0207076 A1 | 8/2011 | Hirsch et al. |
| 2011/0311942 A1 | 12/2011 | Black et al. |
| 2012/0015317 A1 | 1/2012 | Milo |
| 2012/0015320 A1 | 1/2012 | Koo |
| 2012/0077144 A1 | 3/2012 | Fougere et al. |
| 2012/0115102 A1 | 5/2012 | Chen |
| 2012/0219926 A1 | 8/2012 | Sullivan et al. |
| 2012/0237894 A1 | 9/2012 | Maycher et al. |
| 2013/0055513 A1 | 3/2013 | Meadows et al. |
| 2013/0074851 A1 | 3/2013 | Herman |
| 2013/0081217 A1 | 4/2013 | Jeong |
| 2013/0095450 A1 | 4/2013 | Ames |
| 2013/0252193 A1 | 9/2013 | Bowman et al. |
| 2014/0004478 A1 | 1/2014 | Hirsch et al. |
| 2014/0162209 A1 | 6/2014 | Nguyen |
| 2014/0212837 A1 | 7/2014 | Nguyen |
| 2014/0212838 A1 | 7/2014 | Nguyen |
| 2014/0212839 A1 | 7/2014 | Nguyen |
| 2014/0212840 A1 | 7/2014 | Nguyen |
| 2014/0212841 A1 | 7/2014 | Nguyen |
| 2014/0272761 A1 | 9/2014 | Lowe et al. |
| 2014/0349249 A1 | 11/2014 | Reyes |
| 2015/0305842 A1 | 10/2015 | Hirsch et al. |
| 2015/0335409 A1 | 11/2015 | Hirsch |
| 2016/0270892 A1 | 9/2016 | Yoo |
| 2017/0056143 A1 | 3/2017 | Hyun |
| 2017/0156831 A1 | 6/2017 | Reyes |
| 2017/0156832 A1 | 6/2017 | Reyes |
| 2017/0156833 A1 | 6/2017 | Reyes |
| 2018/0125349 A1 | 5/2018 | Lutz |
| 2018/0153637 A1 | 6/2018 | Al-Shawi et al. |
| 2018/0368957 A1 | 12/2018 | Hyun |
| 2019/0099236 A1 | 4/2019 | Jin |
| 2020/0155284 A1 | 5/2020 | Baker |
| 2020/0178680 A1 | 6/2020 | Van Dijk |
| 2020/0253369 A1 | 8/2020 | De Gentile et al. |
| 2020/0352680 A1 | 11/2020 | Nguyen |
| 2020/0383560 A1 | 12/2020 | Day |
| 2021/0204923 A1 | 7/2021 | Ritter |
| 2022/0087799 A1 | 3/2022 | Glen et al. |
| 2022/0378563 A1 | 12/2022 | Cao et al. |
| 2023/0338124 A1 | 10/2023 | Nguyen et al. |
| 2023/0363747 A1 | 11/2023 | Ritter |
| 2024/0024072 A1 | 1/2024 | Nguyen et al. |
| 2024/0115366 A1 | 4/2024 | Rosenberg et al. |
| 2024/0423768 A1 | 12/2024 | Nguyen et al. |
| 2025/0177092 A1 | 6/2025 | Nguyen et al. |
| 2025/0262039 A1 | 8/2025 | Reyes |
| 2025/0275841 A1 | 9/2025 | Nguyen et al. |
| 2025/0288400 A1 | 9/2025 | Ritter |
| 2025/0289148 A1 | 9/2025 | Van Zuilen |

FOREIGN PATENT DOCUMENTS

| | | | |
|---|---|---|---|
| AU | 2018213982 | | 5/2014 |
| AU | 2020274979 | | 12/2025 |
| BR | 1120140116377 | | 5/2014 |
| BR | 1120210224742 | | 11/2021 |
| BR | 112021022474 | A2 | 1/2022 |
| CA | 2919142 | | 5/2014 |
| CA | 2851861 | | 6/2015 |
| CA | 3139689 | | 11/2020 |
| CN | 200420094338.X | | 12/2005 |
| CN | 102026587 | | 4/2011 |
| CN | 102247140 | | 11/2011 |
| CN | 201480039991.2 | | 12/2013 |
| CN | 104490483 | | 4/2015 |
| CN | 105578986 | A | 5/2016 |
| CN | 108366851 | A | 8/2018 |
| CN | 202080043728.6 | | 12/2021 |
| CN | 114302667 | A | 4/2022 |
| CN | ZL 202080043728.6 | | 12/2025 |
| CO | 16002647 | | 1/2016 |
| CO | NC2021/0016591 | | 12/2021 |
| CO | 43270 | | 2/2025 |
| EG | 934/2016 | | 6/2016 |
| EP | 14721736.8 | | 4/2014 |
| EP | 17150671.0 | | 4/2014 |
| EP | 2903557 | | 8/2015 |
| EP | 3184076 | | 6/2017 |
| EP | 20804801.7 | | 11/2021 |
| EP | 3965637 | | 3/2022 |
| EP | 3965637 | B1 | 12/2024 |
| FR | 2992161 | | 12/2013 |
| GB | 2 170 106 | | 7/1986 |
| IN | 201617018861 | | 6/2016 |
| IN | 202117051466 | | 11/2021 |
| IR | 139550140003002818 | | 6/2016 |
| JP | 2016-125196 | | 4/2014 |
| JP | 2015-563172 | | 10/2015 |
| JP | 2016523571 | | 8/2016 |
| JP | 2016190064 | | 11/2016 |
| JP | 2017-518859 | | 7/2017 |
| JP | 2018536525 | | 12/2018 |
| JP | 2022-514453 | | 11/2021 |
| JP | 2022-533276 | | 7/2022 |
| JP | 7617081 | B2 | 1/2025 |
| KR | 100654392 | | 12/2006 |
| KR | 101082826 | | 11/2011 |
| KR | 10-2016-7012389 | | 5/2016 |
| KR | 10-2021-7040518 | | 12/2021 |
| KR | 20220103035 | A | 7/2022 |
| MX | MX/a/2016/002240 | | 2/2016 |
| MX | MX/a/2021/013694 | | 11/2021 |
| MX | 2021013694 | A | 4/2022 |
| MX | 422305 | | 5/2025 |
| NZ | 718848 | | 4/2016 |
| NZ | 782154 | | 11/2021 |
| PH | 1-2016-500682 | | 4/2016 |
| PH | 1-2021-552855 | | 11/2021 |
| RU | 2016126980 | | 7/2016 |
| RU | 2021132536 | | 11/2021 |
| SG | 11201604442 | | 6/2016 |
| SG | 11202112319 | Y | 11/2021 |
| TW | 109115467 | | 5/2020 |
| TW | 202108088 | | 3/2021 |
| UA | a201607289 | | 7/2016 |
| UA | a 2021 06375 | | 11/2021 |
| WO | WO 1999/037238 | | 7/1999 |
| WO | WO 2000/42939 | | 7/2000 |
| WO | WO 00/61031 | | 10/2000 |
| WO | WO 2011/014952 | | 2/2011 |
| WO | PCT/US2014/032892 | | 4/2014 |
| WO | WO 2015/088577 | | 6/2015 |
| WO | WO 2018/126150 | | 7/2018 |
| WO | PCT/US2020/032228 | | 5/2020 |
| WO | WO 2020/231864 | | 11/2020 |
| WO | PCT 1789/2021 | | 11/2021 |

OTHER PUBLICATIONS

New Zealand Application No. 782154, Examination Report dated Jul. 2, 2024.

Singaporean Application No. 11202112319Y, Examination Report dated Jun. 29, 2024.

U.S. Appl. No. 29/950,233, Thien Nguyen, Mouthpiece, filed Jul. 1, 2024.

U.S. Appl. No. 29/950,231, Thien Nguyen, Mouthpiece Mouth Prop, filed Jul. 1, 2024.

Dryshield brochure. Dryshield.com. Publish date: May 2019. Retrieval date: Sep. 15, 2021. Retrieved from internet: https://dryshield.com/ds/Brochure_May2019.pdf (Year: 2019).

"Dryshield (single-use) vs. Zryis/Isolite (single-use) mouthpieces" posted by Mark Frias, RDH. Youtube. Posting date: Jan. 18, 2020. Retrieval date: Sep. 15, 2021. Retrieved from internet: https://www.youtube.com/watch?v=uKX9XahOEY (Year: 2020).

(56)　　　　　　References Cited

OTHER PUBLICATIONS

"Dryshield Presentation (Learn all about Dryshield)" posted by Dryshield isolation System. Youtube. Posting date: Oct. 27, 2014. Retrieval date: Sep. 15, 2021. Retrieved from internet: https://www.youtube.com/watch?v=fcbpz3ixvis (Year: 2014).

"Dryshield Tutorial—Maximize Your Dryshield Experience" posted by Dryshield Isolation System. Youtube. Posting date: Apr. 15, 2015. Retrieval date: Sep. 15, 2021. Retrieved from internet: https://www.youtube.com/watch?v=L2OSYPS8Rc4 (Year: 2015).

PCT Application No. PCT/US2014/032892 International Preliminary Report on Patentability dated Jun. 14, 2016.

PCT Application No. PCT/US2014/032892 International Search Report and Written Opinion dated Sep. 4, 2014.

PCT Application No. PCT/US2020/032228 International Preliminary Report on Patentability dated Nov. 16, 2021.

PCT Application No. PCT/US2020/032228 International Search Report and Written Opinion dated Aug. 12, 2020.

Australian Patent Application No. 2014202637; AU Examination Report dated Jan. 23, 2015.

Brazilian Patent Application No. BR1120140116377 Preliminary Office Action Jan. 7, 2020.

Canadian Patent Application No. 2,919,142; CA Examination Report dated May 31, 2016.

Chinese Patent Application No. 201480039991.2 First Office Action dated Dec. 29, 2016.

Columbian Patent Application No. NC2021/0016591, First Substantive Examination dated Jan. 30, 2024.

European Patent Application No. 14721736.8; Extended European Search Report dated Oct. 20, 2015.

European Patent Application No. 17150671.0; Extended European Search Report dated May 29, 2017.

European Patent Application No. 20804801.7; Extended European Search Report dated Apr. 20, 2023.

European Patent Application No. 20804801.7; Supplementary European Search Report dated May 10, 2023.

Indian Patent Application No. 202117051466; Examination Report dated Nov. 9, 2023.

Japanese Patent Application No. 2022-514453; Non-Final Notification of Reasons for Refusal dated Jan. 30, 2024.

New Zealand Patent Application No. 782154, Examination Report dated Jan. 5, 2024.

U.S. Appl. No. 14/100,323; Final Office Action mailed Oct. 24, 2014.

U.S. Appl. No. 14/100,323; Office Action mailed May 6, 2014.

U.S. Appl. No. 14/228,046; Office Action mailed Oct. 6, 2021.

U.S. Appl. No. 14/228,046; Final Office Action mailed Nov. 27, 2020.

U.S. Appl. No. 14/228,046; Office Action mailed Jan. 10, 2020.

U.S. Appl. No. 14/228,046; Final Office Action mailed Jul. 15, 2019.

U.S. Appl. No. 14/228,046; Office Action mailed Oct. 5, 2018.

U.S. Appl. No. 14/228,046; Final Office Action mailed Jan. 16, 2018.

U.S. Appl. No. 14/228,046; Office Action mailed Jun. 5, 2017.

U.S. Appl. No. 14/228,046; Office Action mailed Nov. 7, 2016.

U.S. Appl. No. 14/228,046; Final Office Action mailed Jun. 6, 2016.

U.S. Appl. No. 14/228,046; Office Action mailed Nov. 6, 2015.

U.S. Appl. No. 14/228,050; Office Action mailed Nov. 4, 2016.

U.S. Appl. No. 14/228,050; Final Office Action mailed May 20, 2016.

U.S. Appl. No. 14/228,050; Office Action mailed Nov. 6, 2015.

U.S. Appl. No. 14/228,054; Final Office Action mailed Jan. 3, 2022.

U.S. Appl. No. 14/228,054; Office Action mailed Jun. 25, 2021.

U.S. Appl. No. 14/228,054; Final Office Action mailed Dec. 22, 2020.

U.S. Appl. No. 14/228,054; Office Action mailed Jan. 13, 2020.

U.S. Appl. No. 14/228,054; Final Office Action mailed Aug. 8, 2019.

U.S. Appl. No. 14/228,054; Office Action mailed Nov. 29, 2018.

U.S. Appl. No. 14/228,054; Final Office Action mailed Nov. 2, 2017.

U.S. Appl. No. 14/228,054; Office Action mailed Apr. 24, 2017.

U.S. Appl. No. 14/228,054; Office Action mailed Dec. 3, 2015.

U.S. Appl. No. 14/228,057; Final Office Action mailed Jan. 5, 2023.

U.S. Appl. No. 14/228,057; Office Action mailed Sep. 2, 2022.

U.S. Appl. No. 14/228,057; Final Office Action mailed Nov. 12, 2021.

U.S. Appl. No. 14/228,057; Office Action mailed May 5, 2021.

U.S. Appl. No. 14/228,057; Final Office Action mailed May 19, 2020.

U.S. Appl. No. 14/228,057; Office Action mailed Oct. 7, 2019.

U.S. Appl. No. 14/228,057; Final Office Action mailed Mar. 22, 2019.

U.S. Appl. No. 14/228,057; Office Action mailed Sep. 7, 2018.

U.S. Appl. No. 14/228,057; Final Office Action mailed Nov. 2, 2017.

U.S. Appl. No. 14/228,057; Office Action mailed Apr. 13, 2017.

U.S. Appl. No. 14/228,057; Final Office Action mailed Jun. 7, 2016.

U.S. Appl. No. 14/228,057; Office Action mailed Nov. 20, 2015.

U.S. Appl. No. 14/228,061; Office Action mailed Dec. 8, 2021.

U.S. Appl. No. 14/228,061; Final Office Action mailed Apr. 29, 2021.

U.S. Appl. No. 14/228,061; Office Action mailed Nov. 27, 2020.

U.S. Appl. No. 14/228,061; Final Office Action mailed Jan. 10, 2020.

U.S. Appl. No. 14/228,061; Final Office Action mailed Jul. 11, 2019.

U.S. Appl. No. 14/228,061; Office Action mailed Oct. 4, 2018.

U.S. Appl. No. 14/228,061; Final Office Action mailed Oct. 20, 2017.

U.S. Appl. No. 14/228,061; Office Action mailed Apr. 12, 2017.

U.S. Appl. No. 14/228,061; Final Office Action mailed Jun. 30, 2016.

U.S. Appl. No. 14/228,061; Office Action mailed Dec. 4, 2015.

U.S. Appl. No. 29/491,367 Final Office Action mailed Mar. 4, 2015.

U.S. Appl. No. 29/491,367 Office Action mailed Nov. 14, 2014.

U.S. Appl. No. 29/477,887 Final Office Action mailed Jun. 1, 2016.

U.S. Appl. No. 29/477,887 Office Action mailed Nov. 27, 2015.

U.S. Appl. No. 29/477,887 Final Office Action mailed May 1, 2015.

U.S. Appl. No. 29/477,887 Office Action mailed Nov. 14, 2014.

U.S. Appl. No. 29/477,888 Office Action mailed Mar. 21, 2017.

U.S. Appl. No. 29/477,888 Final Office Action mailed Jun. 1, 2016.

U.S. Appl. No. 29/477,888 Office Action mailed Dec. 2, 2015.

U.S. Appl. No. 29/477,888 Final Office Action mailed May 1, 2015.

U.S. Appl. No. 29/477,888 Office Action mailed Nov. 14, 2014.

U.S. Appl. No. 16/870,745 Office Action mailed Feb. 17, 2023.

U.S. Appl. No. 16/870,745 Final Office Action mailed May 12, 2022.

U.S. Appl. No. 16/870,745 Office Action mailed Dec. 3, 2021.

U.S. Appl. No. 29/782,645 Office Action mailed Oct. 4, 2021.

U.S. Appl. No. 29/782,638 Office Action mailed Oct. 4, 2021.

U.S. Appl. No. 29/782,644 Final Office Action mailed May 11, 2022.

U.S. Appl. No. 29/782,644 Office Action mailed Oct. 4, 2021.

U.S. Appl. No. 29/782,643 Final Office Action mailed May 11, 2022.

U.S. Appl. No. 29/782,643 Office Action mailed Oct. 4, 2021.

U.S. Appl. No. 29/893,986 Ex Parte Quayle mailed Aug. 15, 2023.

U.S. Appl. No. 18/217,304 Office Action mailed Sep. 29, 2023.

Australian Application No. 2020274979, Examination Report dated Jan. 20, 2025.

Japanese Patent Application No. 2022-514453; Final Notification of Reasons for Refusal dated Jun. 25, 2024.

Singaporean Search Report and Written Opinion dated Dec. 21, 2023.

U.S. Appl. No. 18/376,309 Office Action mailed Jul. 1, 2024.

Chinese Application No. 202080043728.6, First Office Action dated Oct. 28, 2024.

U.S. Appl. No. 18/823,885, Office Action dated Nov. 21, 2024.

U.S. Appl. No. 18/823,885, Thien Nguyen, Intraoral Device, filed Sep. 4, 2024.

U.S. Appl. No. 18/983,258, Thien Nguyen, Dental Mouthpiece, filed Dec. 16, 2024.

(56) References Cited

OTHER PUBLICATIONS

Mexican Application No. MX/a/2021/013694, Official Action dated Oct. 2, 2024.
New Zealand Application No. 782154, Examination Report dated Oct. 9, 2024.
U.S. Appl. No. 29/950,233, Ex Parte Quayle Action dated Sep. 19, 2024.
Canadian Application No. 3,139,689, Examination Report dated Mar. 5, 2025.
Chinese Application No. 202080043728.6, Second Office Action dated May 31, 2025.
Inter Partes Review No. IPR2025-01065, Petition for Inter Partes Review of U.S. Pat. No. 11,826,217 filed Jun. 6, 2025.
Inter Partes Review No. IPR2025-01065, Exhibit No. 1003, Expert Declaration of Dr. Brian P. Black dated Jun. 5, 2025.
Inter Partes Review No. IPR2025-01065, Exhibit No.1008, Solmetex's Complaint for Patent Infringement against Ascentcare (ECF No. 1), filed Sep. 16, 2024.
Inter Partes Review No. IPR2025-01059, Petition for Inter Partes Review of U.S. Pat. No. 11,744,686 filed May 28, 2025.
Inter Partes Review No. IPR2025-01059, Exhibit No. 1003, Expert Declaration of Dr. Brian P. Black dated May 27, 2025.
Inter Partes Review No. IPR2025-01059, Exhibit No.1009, Solmetex's Complaint for Patent Infringement against Ascentcare (ECF No. 1), filed Sep. 16, 2024.
Inter Partes Review No. IPR2025-01059, Exhibit No. 1011, Solmetex Infringement Contentions filed Feb. 20, 2025.
Inter Partes Review No. IPR2025-01104, Petition for Inter Partes Review of U.S. Pat. No. 12,011,329 dated Jun. 7, 2025.
Inter Partes Review No. IPR2025-01104, Exhibit No. 1003, Expert Declaration of Dr. Brian P. Black dated Jun. 6, 2025.
Inter Partes Review No. IPR2025-01104, Exhibit No.1009, Solmetex's Complaint for Patent Infringement against Ascentcare (ECF No. 1), filed Sep. 16, 2024.
Inter Partes Review No. IPR2025-01104, Exhibit No. 1011, Solmetex Infringement Contentions filed Feb. 20, 2025.
Inter Partes Review No. IPR2025-01057, Petition for Inter Partes Review of U.S. Pat. No. 11,589,970 dated May 28, 2025.
Inter Partes Review No. IPR2025-01057, Exhibit No. 1003, Expert Declaration of Dr. Brian P. Black dated May 27, 2025.
Inter Partes Review No. IPR2025-01057, Exhibit No.1009, Solmetex's Complaint for Patent Infringement against Ascentcare (ECF No. 1), filed Sep. 16, 2024.
Inter Partes Review No. IPR2025-01057, Exhibit No. 1011, Solmetex Infringement Contentions filed Feb. 20, 2025.
Inter Partes Review No. IPR2025-01020, Petition for Inter Partes Review of U.S. Pat. No. 11,589,969 dated May 20, 2025.
Inter Partes Review No. IPR2025-01020, Exhibit No. 1003, Expert Declaration of Dr. Brian P. Black dated May 19, 2025.
Inter Partes Review No. IPR2025-01020, Exhibit No.1009, Solmetex's Complaint for Patent Infringement against Ascentcare (ECF No. 1), filed Sep. 16, 2024.
Inter Partes Review No. IPR2025-01020, Exhibit No. 1011, Solmetex Infringement Contentions filed Feb. 20, 2025.
Inter Partes Review No. IPR2025-01175, Petition for Inter Partes Review of U.S. Pat. No. 12,290,418 dated Jun. 24, 2025.
Inter Partes Review No. IPR2025-01175, Exhibit No. 1003, Expert Declaration of Dr. Brian P. Black dated Jun. 23, 2025.
Inter Partes Review No. IPR2025-01175, Exhibit No. 1011, Solmetex Infringement Contentions filed Feb. 20, 2025.
Post-Grant Review No. PGR2025-00058, Petition for Post Grant Review of U.S. Pat. No. 12,167,948 dated Jun. 19, 2025.
Post-Grant Review No. PGR2025-00058, Exhibit No. 1003, Expert Declaration of Dr. Brian P. Black dated Jun. 19, 2025.
Post-Grant Review No. PGR2025-00058, Exhibit No. 1008, Solmetex's Complaint for Patent Infringement against Ascentcare (ECF No. 1), filed Sep. 16, 2024.
Post-Grant Review No. PGR2025-00058, Notice of Filing Date Accorded to Petition and Time for Filing Patent Owner Preliminary Response.

Inter Partes Review No. IPR2025-01065, Patent Owner's Discretionary Denial Brief filed Sep. 2, 2025.
Inter Partes Review No. IPR2025-01065, Exhibits 2001-2018, submitted with Patent Owner's Discretionary Denial Brief filed Sep. 2, 2025.
Inter Partes Review No. IPR2025-01059, Patent Owner's Discretionary Denial Brief filed Aug. 25, 2025.
Inter Partes Review No. IPR2025-01059, Exhibits 2001-2024, submitted with Patent Owner's Discretionary Denial Brief filed Aug. 25, 2025.
Inter Partes Review No. IPR2025-01104, Patent Owner's Discretionary Denial Brief filed Sep. 2, 2025.
Inter Partes Review No. IPR2025-01104, Exhibits 2001-2005, 2007-2013, and 2015-2028, submitted with Patent Owner's Discretionary Denial Brief filed Sep. 2, 2025.
Inter Partes Review No. IPR2025-01057, Patent Owner's Discretionary Denial Brief filed Aug. 25, 2025.
Inter Partes Review No. IPR2025-01057, Exhibits 2001, 2002 and 2004-2025, submitted with Patent Owner's Discretionary Denial Brief filed Aug. 25, 2025.
Inter Partes Review No. IPR2025-01020, Patent Owner's Discretionary Denial Brief filed Aug. 17, 2025.
Inter Partes Review No. IPR2025-01020, Exhibits 2001-2015, submitted with Patent Owner's Discretionary Denial Brief filed Aug. 17, 2025.
Inter Partes Review No. IPR2025-01175, Patent Owner's Discretionary Denial Brief filed Sep. 8, 2025.
Inter Partes Review No. IPR2025-01175, Exhibits 2001-2005, 2007-2013, and 2015-2030, submitted with Patent Owner's Discretionary Denial Brief filed Sep. 8, 2025.
Post-Grant Review No. PGR2025-00058, Patent Owner's Discretionary Denial Brief filed Sep. 8, 2025.
Post-Grant Review No. PGR2025-00058, Exhibits 2001-2022, submitted with Patent Owner's Discretionary Denial Brief filed Sep. 8, 2025.
Post-Grant Review No. PGR2025-00058, Notice of Filing Date Accorded to Petition and Time for Filing Patent Owner Preliminary Response Jul. 8, 2025.
Indian Application No. 202117051466, Hearing Notice dated Aug. 28, 2025.
Philippines Application No. 1-2021-552855, Substantive Examination Report dated Sep. 5, 2025.
Inter Partes Review No. IPR2025-01065, Petitioner's Response to Patent Owner's Brief on Discretionary Denial dated Sep. 30, 2025.
Inter Partes Review No. IPR2025-01065, Exhibits 1024-1026, submitted with Petitioner's Response to Patent Owner's Brief on Discretionary Denial dated Sep. 30, 2025.
Inter Partes Review No. IPR2025-01059, Patent Owner's Preliminary Response dated Oct. 1, 2025.
Inter Partes Review No. IPR2025-01059, Exhibits 2026-2037, Patent Owner's Preliminary Response dated Oct. 1, 2025.
Inter Partes Review No. IPR2025-01059, Petitioner's Response to Patent Owner's Brief on Discretionary Denial dated Sep. 24, 2025.
Inter Partes Review No. IPR2025-01059, Exhibits 1027-1032, submitted with Petitioner's Response to Patent Owner's Brief on Discretionary Denial dated Sep. 24, 2025.
Inter Partes Review No. IPR2025-01104, Petitioner's Response to Patent Owner's Brief on Discretionary Denial dated Sep. 30, 2025.
Inter Partes Review No. IPR2025-01104, Exhibits 1025-1032, submitted with Petitioner's Response to Patent Owner's Brief on Discretionary Denial dated Sep. 30, 2025.
Inter Partes Review No. IPR2025-01057, Patent Owner's Preliminary Response dated Sep. 23, 2025.
Inter Partes Review No. IPR2025-01057, Exhibits 2026-2037, submitted with Patent Owner's Preliminary Response dated Sep. 23, 2025.
Inter Partes Review No. IPR2025-01057, Petitioner's Response to Patent Owner's Brief on Discretionary Denial dated Sep. 23, 2025.
Inter Partes Review No. IPR2025-01057, Exhibits 1026-1032, submitted with Petitioner's Response to Patent Owner's Brief on Discretionary Denial dated Sep. 23, 2025.
Inter Partes Review No. IPR2025-01020, Petitioner's Sur-Reply to Patent Owner's Brief on Discretionary Denial dated Sep. 25, 2025.

(56) References Cited

OTHER PUBLICATIONS

Inter Partes Review No. IPR2025-01020, Patent Owner's Reply in Support of Discretionary Denial dated Sep. 24, 2025.
Inter Partes Review No. IPR2025-01020, Petitioner's Response to Patent Owner's Brief on Discretionary Denial dated Sep. 18, 2025.
Inter Partes Review No. IPR2025-01020, Exhibits 1023-1030, submitted with Petitioner's Response to Patent Owner's Brief on Discretionary Denial dated Sep. 18, 2025.
Inter Partes Review No. IPR2025-01020, Patent Owner's Preliminary Response dated Sep. 18, 2025.
Inter Partes Review No. IPR2025-01020, Exhibits 2016-2026, submitted with Patent Owner's Preliminary Response dated Sep. 18, 2025.
Inter Partes Review No. IPR2025-01175, Petitioner's Response to Patent Owner's Brief on Discretionary Denial dated Oct. 6, 2025.
Inter Partes Review No. IPR2025-01175, Exhibits 1024-1032, submitted with Petitioner's Response to Patent Owner's Brief on Discretionary Denial dated Oct. 6, 2025.
Post-Grant Review No. PGR2025-00058, Petitioner's Response to Patent Owner's Brief on Discretionary Denial dated Oct. 6, 2025.
Post-Grant Review No. PGR2025-00058, Exhibits 1024-1026, submitted with Petitioner's Response to Patent Owner's Brief on Discretionary Denial dated Oct. 6, 2025.
"Dryshield Tutorial—Maximize Your Dryshield Experience" posted by Dryshield Isolation System. Youtube. Posting date: Apr. 22, 2015. Retrieval date: Oct. 9, 2025. Retrieved from internet: https://www.youtube.com/watch?v=fEkezLuvsL0 (Year: 2015).
DXM EZ Bite Block Dental Disposable Mouth Prop, Retrieval date: Oct. 9, 2025. Retrieved from the internet: https://www.amazon.com/dp/B0BCC9BWRF, Reference dated Aug. 29, 2022.
Snawop Dental Bite Blocks, Retrieval date: Oct. 9, 2025 at https://www.amazon.com/dp/B0C4L76KCT/ Reference dated May 8, 2023.
Zirc, "Lingua-Fix Disposable Saliva Ejector 50/Pk. White. Provides a dry work area", Retrieval Date: Oct. 9, 2025. Retrieved from the Internet: https://www.net32.com/ec/linguafix-disposable-saliva-ejector-50-white-provides-d-45720 Reference dated Aug. 15, 2013.
Brazilian Application No. BR112021022474-2, Preliminary Office Action dated Oct. 21, 2025.
U.S. Appl. No. 29/950,231, Office Action dated Oct. 31, 2025.
Inter Partes Review No. IPR2025-01065 Patent Owner's Preliminary Response dated Oct. 15, 2025.
Inter Partes Review No. IPR2025-01065, Exhibits 2019-2024, submitted with Patent Owner's Preliminary Response dated Oct. 15, 2025.
Inter Partes Review No. IPR2025-01065 and Post-Grant Review No. PGR2025-00058 Director Discretionary Decision Refer dated Oct. 17, 2025.
Inter Partes Review Nos. IPR2025-01104 and IPR2025-01175 Director Discretionary Decision Deny dated Oct. 17, 2025.
Inter Partes Review No. IPR2025-01104, Patent Owner's Preliminary Response dated Oct. 15, 2025.
Inter Partes Review No. IPR2025-01104, Exhibits 2029-2040, submitted with Patent Owner's Preliminary Response dated Oct. 15, 2025.
Inter Partes Review Nos. IPR2025-01020, IPR2025-01057, and IPR2025-01059 Director Discretionary Decision Deny dated Oct. 10, 2025.
Inter Partes Review No. IPR2025-01175, Patent Owner's Preliminary Response dated Oct. 22, 2025.
Inter Partes Review No. IPR2025-01175, Exhibits 2031-2042, submitted with Patent Owner's Preliminary Response dated Oct. 22, 2025.
Defendant's Initial Invalidity Contentions (filed in United States District Court, Western District of Michigan, Southern Division Case No. 1:24-cv-00954-RJJ-MV on Aug. 18, 2025).
Defendant's Initial Invalidity Contentions, Exhibits A-J (filed in United States District Court, Western District of Michigan, Southern Division Case No. 1:24-cv-00954-RJJ-MV on Aug. 18, 2025).
Solmetex, LLC's Opening Brief in Support of Claim Construction (filed in United States District Court, Western District of Michigan, Southern Division Case No. 1:24-cv-00954-RJJ- MV on Oct. 10, 2025).
Declaration of Professor Charles Garris, Ph.D., Exhibit L, Regarding Claim Construction, submitted with Solmetex, LLC's Opening Brief in Support of Claim Construction (filed in United States District Court, Western District of Michigan, Southern Division Case No. 1:24- cv-00954-RJJ-MV on Oct. 10, 2025).
Defendant/Counter-Plaintiff Ascentcare Dental Products, Inc's Opening Markman Brief (filed in United States District Court, Western District of Michigan, Southern Division Case No. 1:24-cv-00954-RJJ-MV on Oct. 10, 2025).
Declaration of Nathan P. Sportel in Support of Defendant/Counter-Plaintiff's Opening Markman Brief, with Exhibit O Shen Declaration and Exhibit P Crossman Declaration (filed in United States District Court, Western District of Michigan, Southern Division Case No. 1:24- cv-00954-RJJ-MV on Oct. 10, 2025).
Plaintiff/Counter-Defendant Solmetex, LLC's Responsive Claim Construction Brief (filed in United States District Court, Western District of Michigan, Southern Division Case No. 1:24-cv-00954-RJJ-MV on Nov. 13, 2025).
Defendant Ascentcare Dental Products, Inc.'s Responsive Claim Construction Brief (filed in United States District Court, Western District of Michigan, Southern Division Case No. 1:24-cv-00954-RJJ-MV on Nov. 13, 2025).
Claim Construction Memorandum Opinion and Order (filed in United States District Court, Western District of Michigan, Southern Division Case No. 1:24-cv-00954-RJJ-MV on Jan. 23, 2026).
Inter Partes Review No. IPR2025-01104, Decision Denying Institution of Inter Partes Review, dated Dec. 23, 2025.
Inter Partes Review No. IPR2025-01175, Decision Denying Institution of Inter Partes Review, dated Dec. 23, 2025.
U.S. Appl. No. 30/016,401, Office Action dated Apr. 1, 2026.

* cited by examiner

210

310

320

140

INTRAORAL DEVICE

CROSS-REFERENCE TO RELATED APPLICATIONS

The present application is a continuation and claims the priority benefit of U.S. patent application Ser. No. 18/679,097 filed May 30, 2024, which is a continuation and claims the priority benefit of U.S. patent application Ser. No. 18/217,304 filed Jun. 30, 2023, now U.S. Pat. No. 12,011,329, which is a continuation and claims the priority benefit of U.S. patent application Ser. No. 14/228,057 filed Mar. 27, 2014, now U.S. Pat. No. 11,744,686, which is a continuation and claims the priority benefit of U.S. patent application Ser. No. 14/100,323 filed Dec. 9, 2013, now U.S. Pat. No. 8,911,232, which claims the priority benefit of U.S. provisional patent application No. 61/734,939 filed Dec. 7, 2012, the disclosures of which are incorporated herein by reference.

BACKGROUND OF THE INVENTION

1. Field of the Invention

The present invention generally relates to the field of dental mouthpieces. More specifically, the present invention relates to intraoral dental suction and isolation mouthpieces.

2. Description of Related Art

Various mouthpieces are currently used by dental health professionals, dental hygienists, and dental assistants in the field of dentistry. In the past, a dental patient has been treated by a traditional two-person team that comprises a dental professional and a dental assistant. Further, dental treatment may be provided by the team using many different types of dental equipment and materials. Such dental equipment and materials may include such items as an intraoral mirror, a bite block, a slow speed suction ejector, a high speed suction ejector, gauzes, cotton rolls, and dry angles. Each item of dental equipment may be used for different purposes, though some may be used in combination for some types of dental services. As such, a dental professional seeking to provide such dental services may need to use multiple items of such dental equipment. An important role of the dental assistant is therefore to assist the dental professional in coordinating the use of these multiple items of different equipment and materials.

There is, therefore, a need in the art for improved systems and methods of providing dental services in a more efficient, comfortable, and safe manner to the dental patient.

SUMMARY OF THE CLAIMED INVENTION

Embodiments of the present invention may include a mouthpiece that may be attached to a high-suction dental adapter for the purpose of assisting the dental staff during dental procedures through chair-side, hands-free suction, and isolation. Such a mouthpiece may comprise a main body portion, a cheek retractor portion, and a suction connector portion. In some embodiments, the main body portion, cheek retractor portion, and suction connector portion (and sub-portions thereof) may be molded in one piece, preferably by injection molding. In an exemplary embodiment, the mouthpiece may be made of a material that is flexible, translucent, conducive to injection molding, high heat-resistant, and autoclavable. Such a material may include silicone. Because the mouthpiece may be made of a high heat-resistant and autoclavable material, such a mouthpiece may be reusable.

The main body portion may comprise an enclosed pocket made up of an anterior wall, a posterior wall, and a side wall in between the anterior and posterior walls. The side wall may be perforated with a plurality of perforations. Such perforations may constitute a mesh. Additional perforations may be located on the anterior and posterior walls. The main body portion may further include a slit along a longitudinal, central axis on the anterior wall. Such openings (e.g., perforations and slit) allow for suction of air, fluids, and small debris from the patient's mouth, through the openings into the interior portion, and into the suction connector portion towards a suction source. Because the mouthpiece is made of a flexible and resilient material (e.g., silicone), the mouthpiece may be bent when placed in a patient's mouth to conform to the shape of the mouth. When properly positioned, the suction connector portion may protrude from one side of the patient's mouth, while the main body lies against the back of the patient's mouth, and the cheek retractor presses against the patient's cheek on the opposite side of the patient's mouth.

The main body may further include an protruding bridge structure on the interior surface of the posterior wall. Such a bridge structure may protrude from the interior surface in a wave shape with crests and troughs. The crests provide a plurality of contact points with the anterior wall to keep the anterior wall separated from the posterior wall during suction. Meanwhile, the troughs provide gaps that allow for suction of air, fluids, and small debris through the bridge structure.

DETAILED DESCRIPTION

Embodiments of the present invention provide for a mouthpiece comprising a main body portion, a cheek retractor portion, and a suction connector portion. In some embodiments, the main body portion, cheek retractor portion, and suction connector portion (and sub-portions thereof) may be molded as one-piece, preferably by injection molding. In an exemplary embodiment, the mouthpiece may be made of a material that is flexible, translucent, conducive to injection molding, high heat-resistant, and autoclavable. Such a material may include silicone. Because the mouthpiece may be made of a high heat-resistant and autoclavable material, such a mouthpiece may be reusable.

Figure 1A:
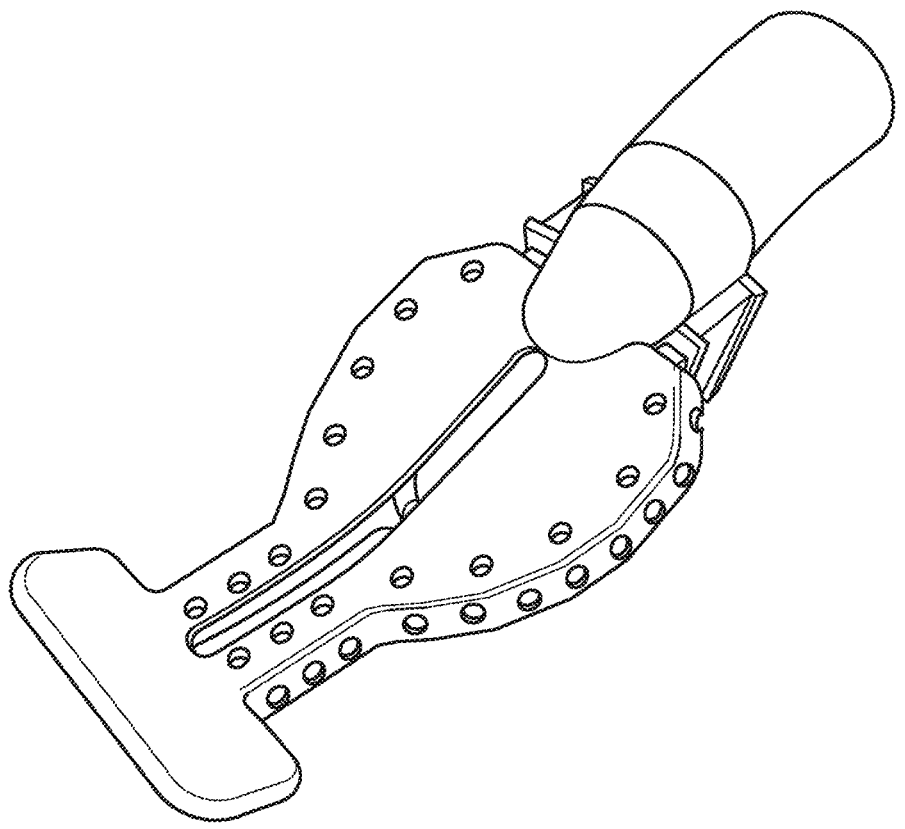
FIG. 1A is a perspective view of an exemplary mouthpiece with a detachable mouth prop.
Figure 1B:
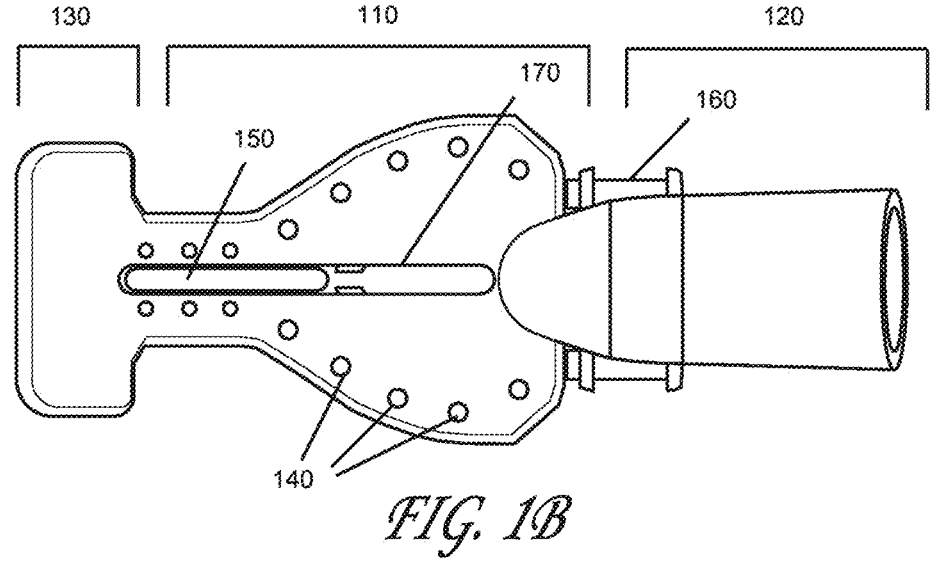
FIG. 1B is a top view of the exemplary mouthpiece and detachable mouth prop of FIG. 1A.
Figure 1C:
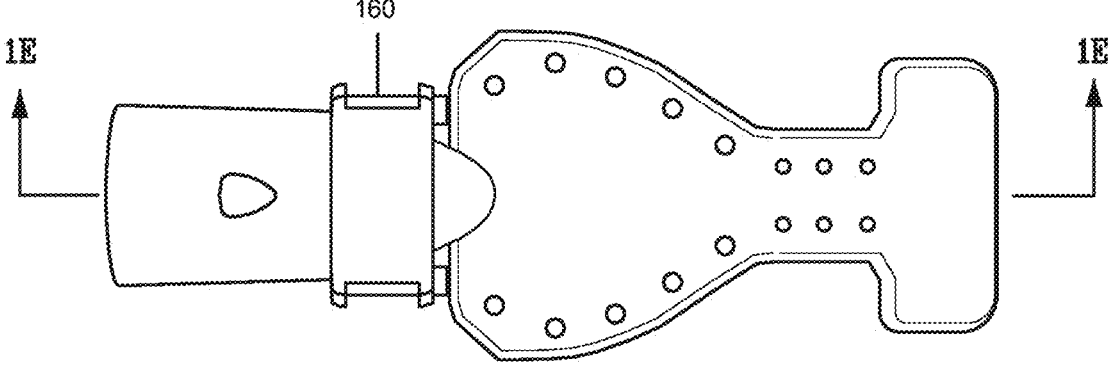
FIG. 1C is a bottom view of the exemplary mouthpiece and detachable mouth prop of FIG. 1A.
Figure 1D:
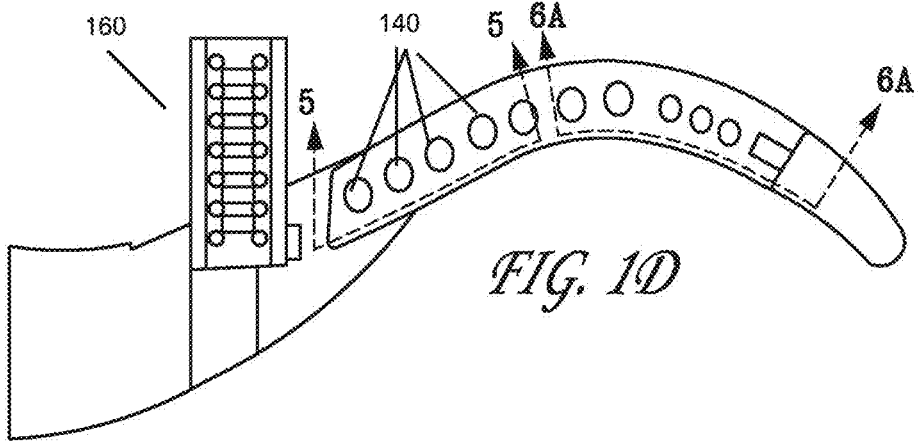
FIG. 1D is a side view of the exemplary mouthpiece and detachable mouth prop of FIG. 1A.

FIGS. 1A-E are different views of an exemplary mouthpiece with an attachable mouth prop 160, while FIGS. 2A-E are different views of the exemplary mouthpiece of FIG. 1A where the attachable mouth prop 160 has been detached. Such a mouthpiece may include a main body portion 110, a suction connector portion 120, and a cheek retractor portion 130.

The main body portion 110 may include mesh or perforations 140, a stability bar 150, an open slit 170, and an internal bridge 180. The main body portion 110 may connect to a suction connector portion 120 on one end and a cheek retractor portion 130 at the other end. Such a cheek retractor portion 130 may be configured to press against and retract a patient's cheek away from the patient's teeth. When placed in a patient's mouth, the suction connector portion 120 may protrude from one side of the patient's mouth, while the main body portion 110 lies against the back of the patient's mouth, and the cheek retractor portion 130 retracts the patient's cheek on the opposite side of the patient's mouth. The flexibility of the material used to form the mouthpiece allows for some bending when placed in the patient's mouth. The material is, however, resilient enough that the cheek retractor portion presses against the inside of the patient's cheek with such pressure being sufficient to move the cheek away from the patient's teeth.

An exemplary main body portion 110, when placed in a mouth, may include an anterior wall facing the front of the mouth (e.g., the side with slit 170) and a posterior wall facing the back of the mouth. The two walls may connect at a superior wall and an inferior wall forming a body that is at least partially enclosed.

Superior may be used herein to refer to the side that rests against a roof of a patient's mouth when placed therein, and inferior may be used to refer to the side that rests against the floor of the patient's mouth. The superior and inferior sides may be formed identically, which may allow for the mouthpiece to change orientation such that the superior side may appear as the inferior side and vice versa, in the new orientation. When in use, the respective sides of the main body portion 110 may serve to protect and separate the top of the mouth and the bottom of the mouth/tongue. In addition, the main body portion 110 may also serve to protect the back of the mouth (e.g., throat and airway) from falling debris.

Much of the main body portion 110 of the mouthpiece may be shaped as a straight-line arrowhead or shield whose base generally conforms to the intraoral shape of a patient's mouth. Differently-sized mouthpieces may be provided for differently-sized mouths of adults and children. Part of the base side of the arrowhead may be formed with thicker walls than the rest of the main body. Such thickening may provide additional stability.

Figure 4:
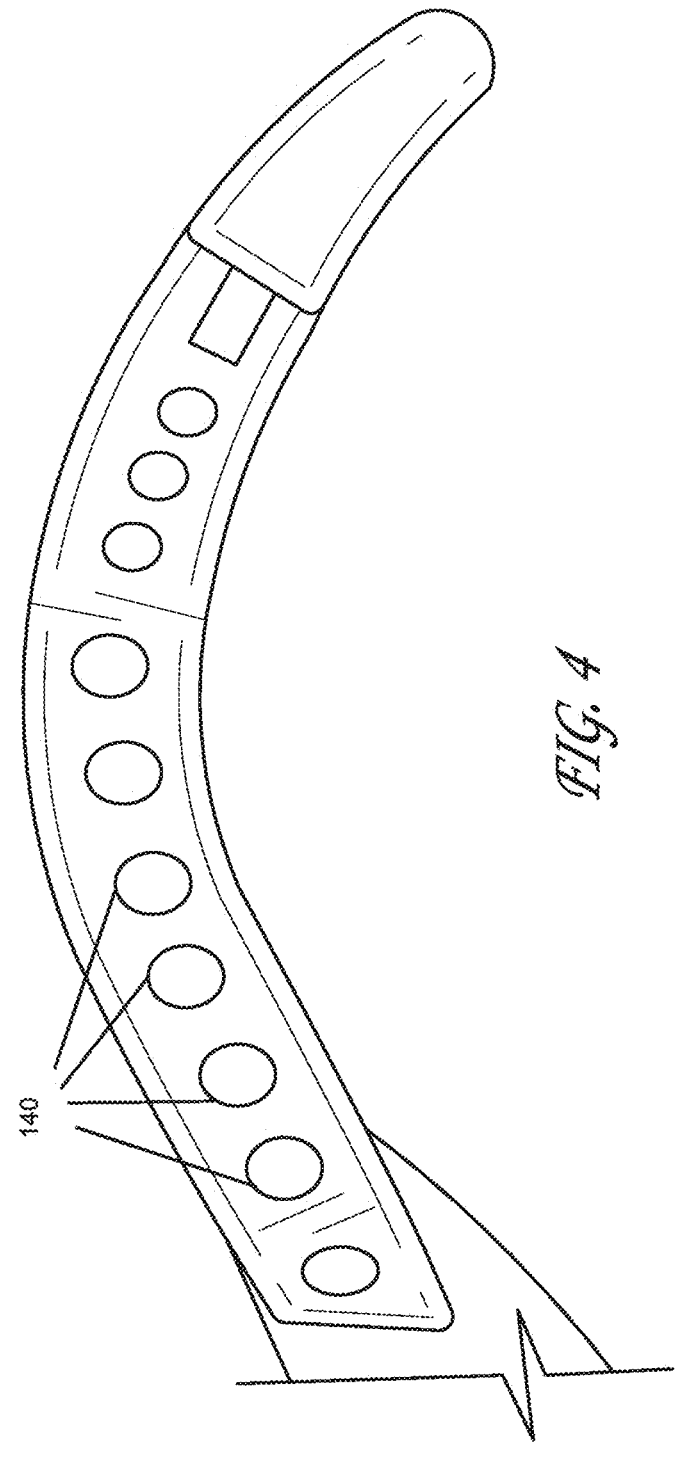
FIG. 4 is a close-up view of exemplary mesh sides in an exemplary mouthpiece.

In addition, the main body portion 110 of the mouthpiece may include a plurality of holes 140 distributed along the superior and inferior sides of the anterior and posterior walls to assist in suctioning of water, saliva and debris from the oral cavity. In some embodiments, a set of holes may also form a mesh along the walls of the superior and inferior edges. FIG. 4 is a close-up view of an exemplary mesh wall in an exemplary mouthpiece.

At the narrow end of the arrowhead that connects to the cheek retractor portion 130, the main body portion 110 may include a rectangular portion. Narrower than the base of the arrowhead, the rectangle may additionally include a reinforcing bar (or stability bar) 150 (described in further detail below) and may be at least partially crossed by a slit 170 (described in further detail below) into the interior of the pocket of the main body portion 110.

Figure 6A:
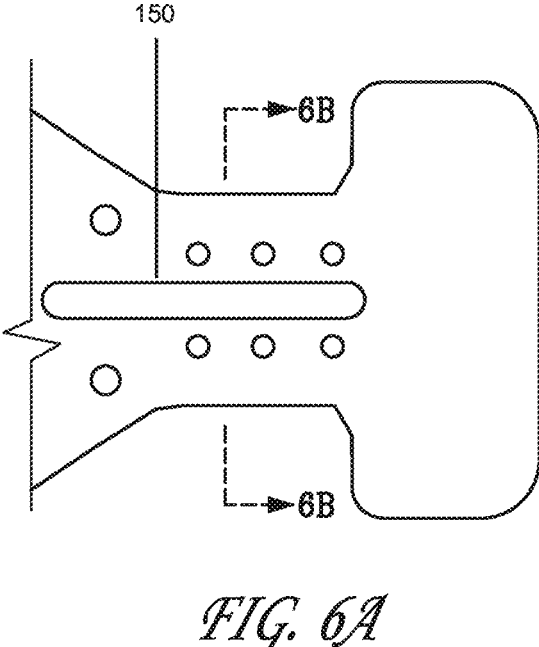
FIG. 6A is a close-up view of an exemplary reinforcing bar in an exemplary mouthpiece.
Figure 6B:
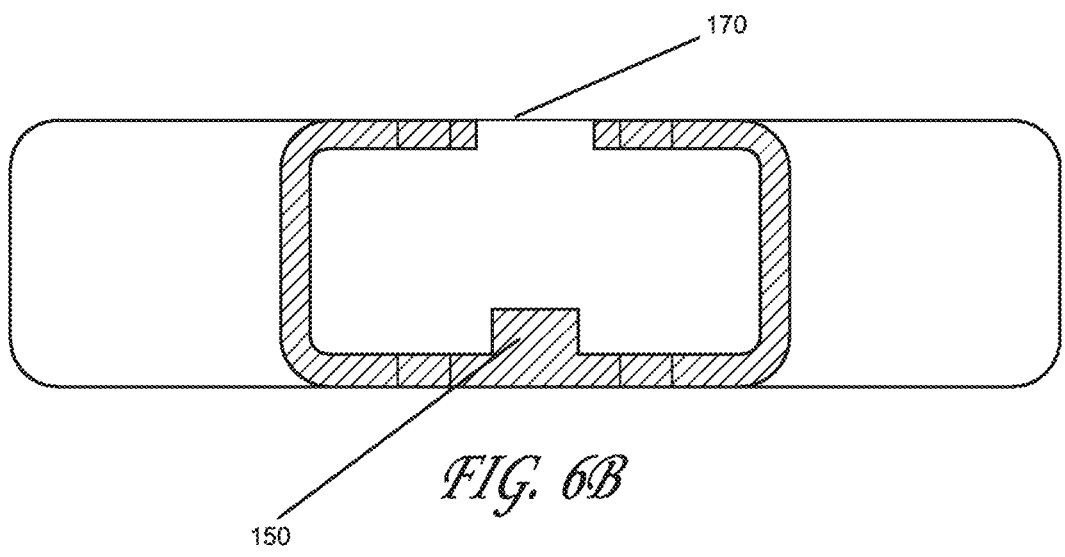
FIG. 6B is a cross-sectional view of the exemplary reinforcing bar of FIG. 6A.

Stability bar 150 may be a protrusion or otherwise a thickened area that reinforces the stability of the rectangular portion and assist in shaping this region to the intraoral posterior shape of a patient's mouth. FIG. 6A is a close-up view of an exemplary stability bar 150 of an exemplary mouthpiece. FIG. 6B is a cross-sectional view of the exemplary reinforcing bar in the cheek retractor connector portion of FIG. 6A.

In some embodiments, the internal, rectangular-shaped reinforcing or stability bar 150 may be located distally to the internal wavelike bridge structure 180 and attached to both the interior side of the posterior surface of the main body and the rectangular portion. Such a stability bar 150 may be located in the area where a positioned mouthpiece begins to wrap from the lingual side of the most posterior mandibular tooth, around the distal side of the most posterior tooth, and to anterior side of the most posterior mandibular tooth, thereby assisting in shaping the mouthpiece to the general intraoral shape of a patient's mouth.

Various embodiments of the mouthpiece may further include a longitudinal, open slit 170 extending over approximately two-thirds of the main body on the anterior surface. Running along the center of the main body across the rectangle and most of the arrowhead, such a slit 170 may assist in capture and suction of water, saliva and debris, as well as assisting in cleaning and maintenance.

Figure 1E:
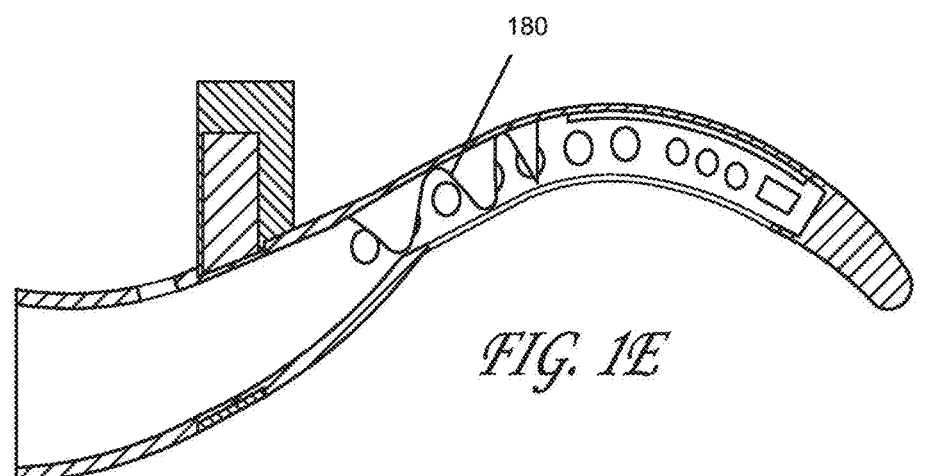
FIG. 1E is a cross-sectional view of the exemplary mouthpiece and detachable mouth prop of FIG. 1A.
Figure 2A:
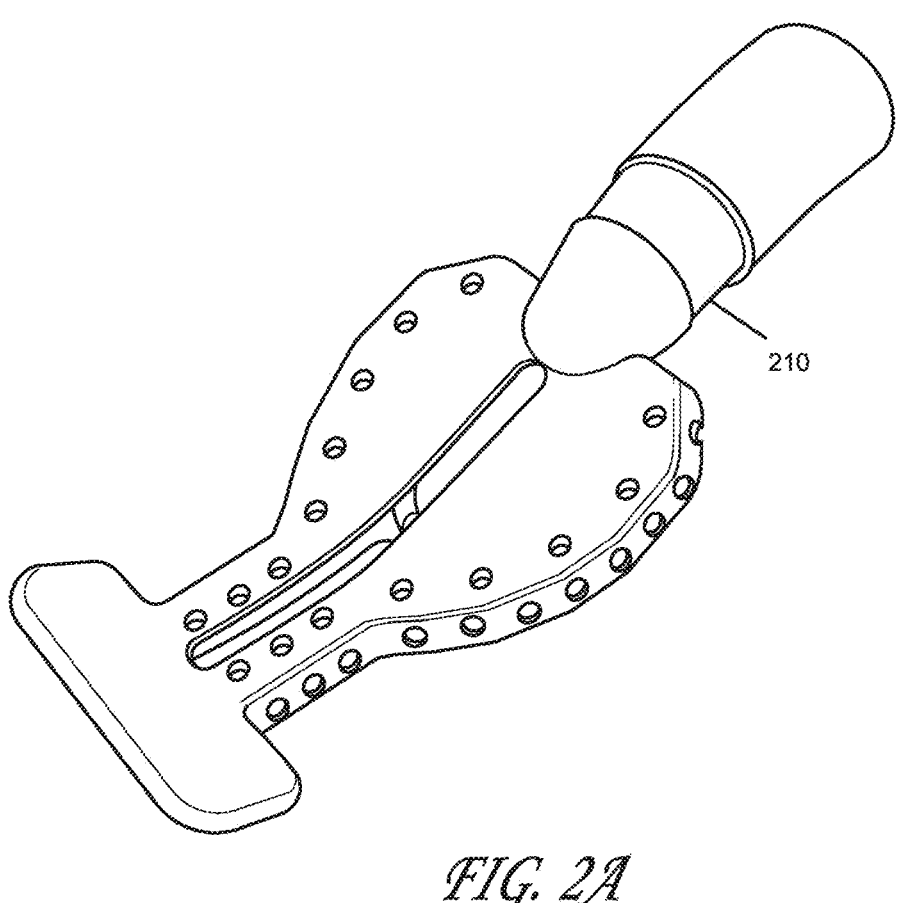
FIG. 2A is a perspective view of the exemplary mouthpiece of FIG. 1A where the detachable mouth prop has been detached.
Figure 2B:
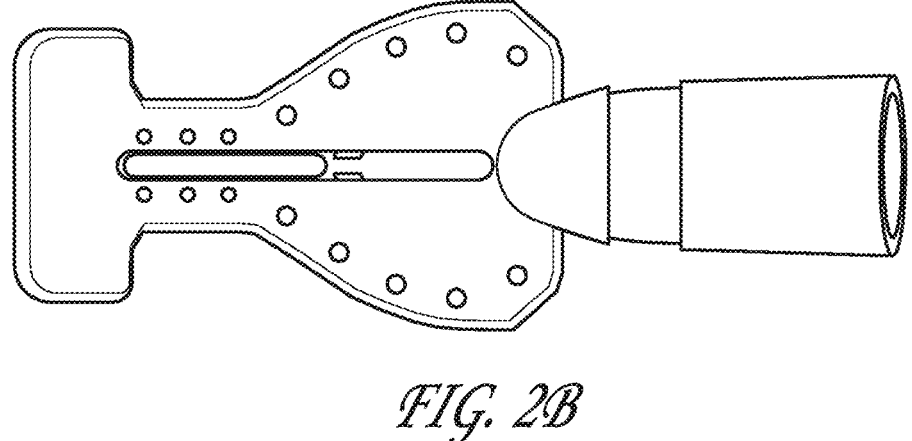
FIG. 2B is a top view of the exemplary mouthpiece of FIG. 2A.
Figure 2C:
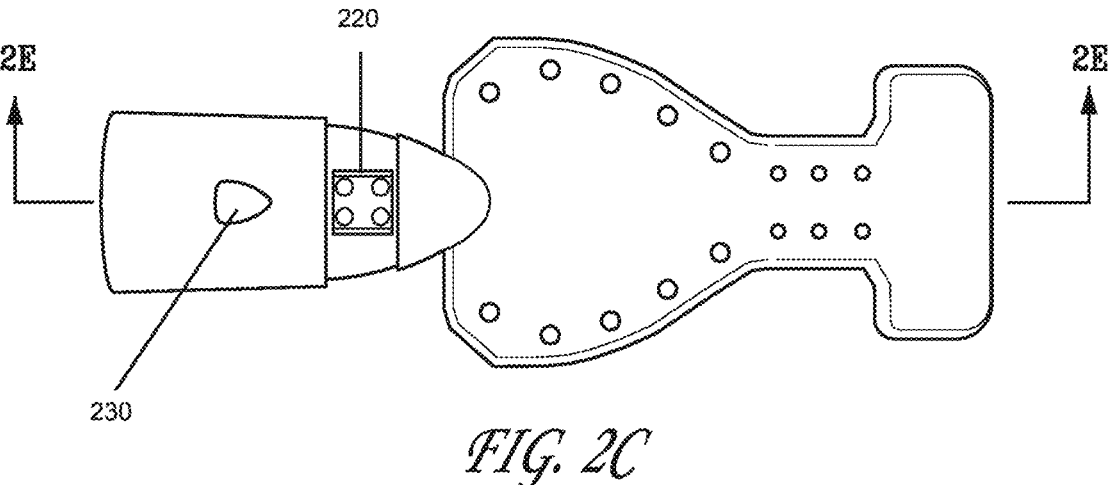
FIG. 2C is a bottom view of the exemplary mouthpiece of FIG. 2A.
Figure 2D:
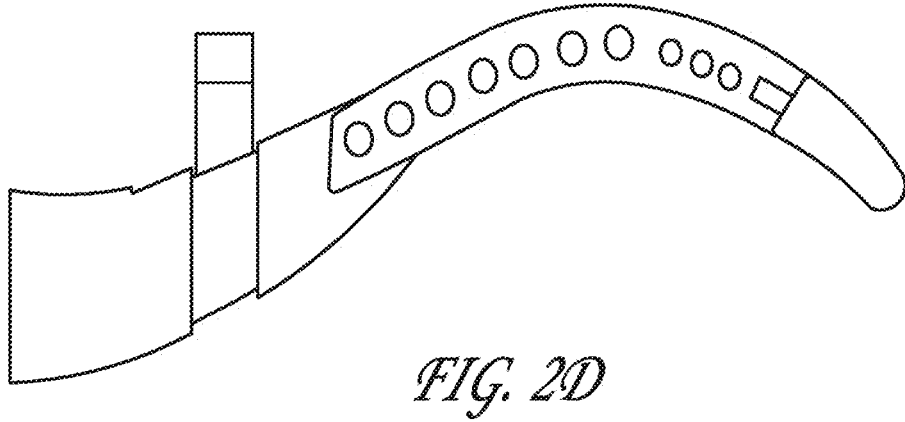
FIG. 2D is a side view of the exemplary mouthpiece of FIG. 2A.
Figure 2E:
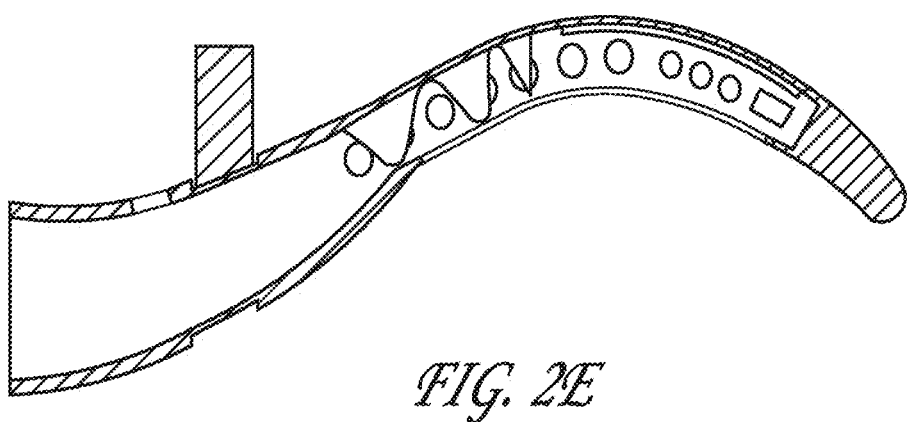
FIG. 2E is a cross-sectional view of the exemplary mouthpiece of FIG. 2A.
Figure 3A:
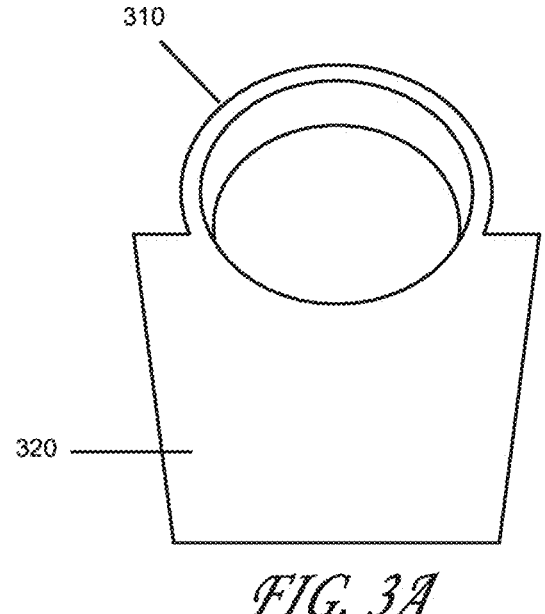
FIG. 3A is a front view of an exemplary mouth prop.
Figure 3D:
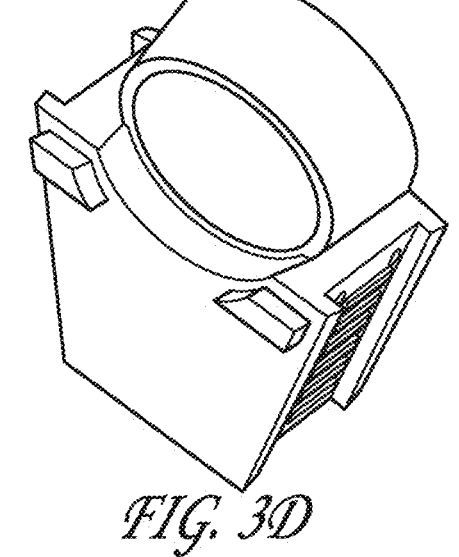
FIG. 3D is a perspective view of the exemplary mouth prop of FIG. 3A.
Figure 3B:
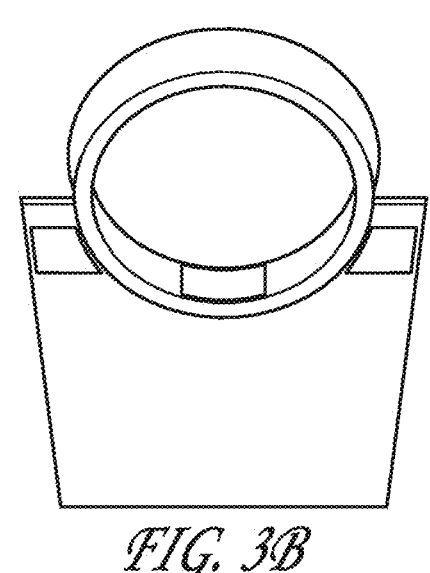
FIG. 3B is a back view of the exemplary mouth prop of FIG. 3A.
Figure 3E:
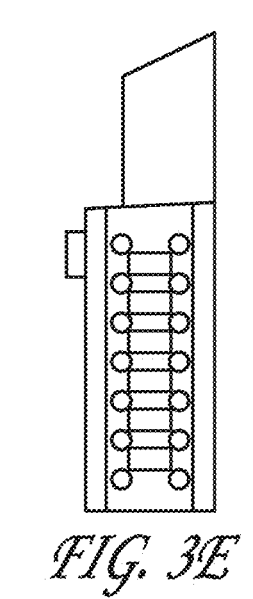
FIG. 3E is a side view of the exemplary mouth prop of FIG. 3A.
Figure 3C:
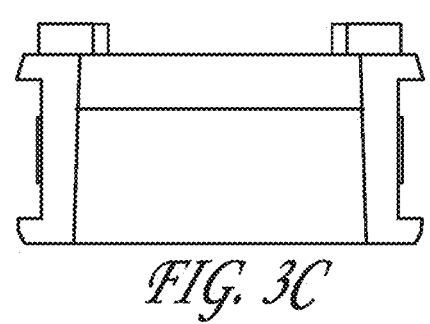
FIG. 3C is a bottom view of the exemplary mouth prop of FIG. 3A.
Figure 3F:
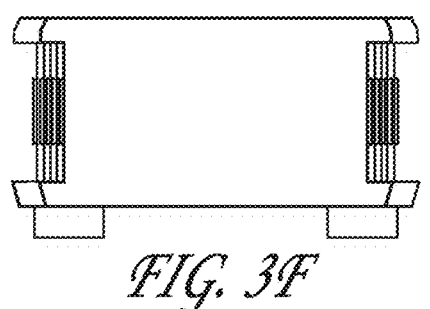
FIG. 3F is a top view of the exemplary mouth prop of FIG. 3A.
Figure 5:
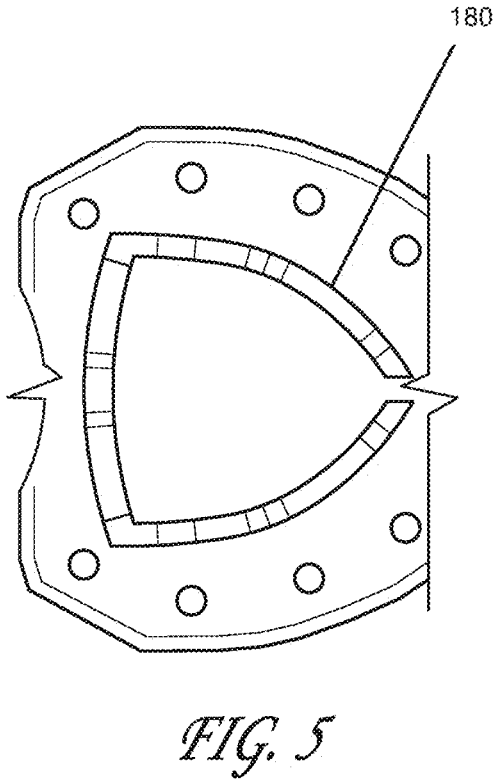
FIG. 5 is a close-up view of an internal bridge in an exemplary mouthpiece.

Additionally, the main body of the mouthpiece may include a bridge structure 180 on an interior surface to ensure that the anterior and posterior surfaces remain separated during suction. FIG. 1E is a cross-sectional view of the mouthpiece in which the bridge structure 180 is illustrated. FIG. 5 is a close-up view of the bridge structure 180 without the surrounding walls of the main body portion. Such a bridge structure 180 may be formed as an wave-like protrusion that generally corresponds to the distance between the anterior and posterior walls extending substantially (e.g., within 1 mm) the full distance at its crest and substantially flush to the surface at its trough. In some embodiments, the bridge structure 180 may be centrally-located in the main body portion 110 of the mouthpiece. The gaps (or troughs) between the waves of the bridge structure 180 assist in the suction-driven transfer of water and saliva to the suction connector portion 120 and ultimately, into a central suction vacuum. In some embodiments, the bridge structure 180 may follow the shape of a logo (e.g., an arrowhead or shield).

The suction connector portion 120 may be oval-shaped and also attached to the main body portion 110. The suction connector portion 120 may be formed with thicker walls than the main body portion 110 and configured to attach to a high-suction vacuum adapter and to assist in transferring water, saliva, and debris from the oral cavity to the external adapter for removal. The suction connector portion 120 may also include an internal stop to assist in sliding the mouthpiece onto the adapter to a desired depth. The suction connector portion 120 may additionally have an external, concave, notched region 210 that corresponds to a removable strap such that when the strap is in place, the external walls of the strap and the rest of the connector portion may be flush.

Figure 7A:
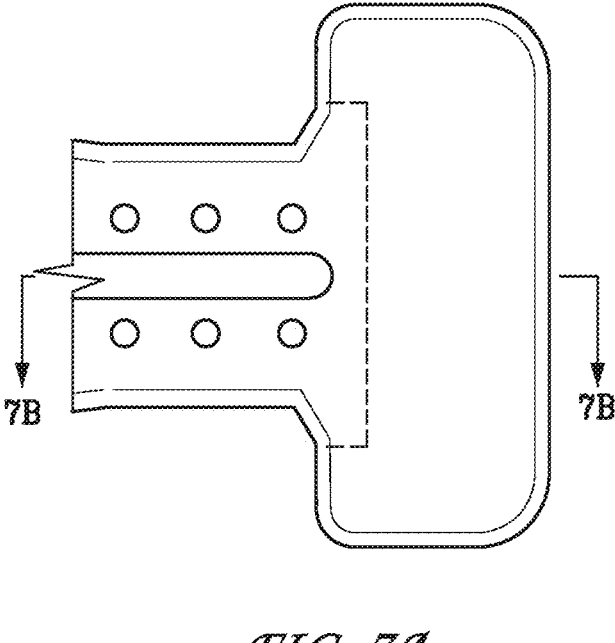
FIG. 7A is a close-up view of an exemplary cheek retractor portion in an exemplary mouthpiece.
Figure 7B:
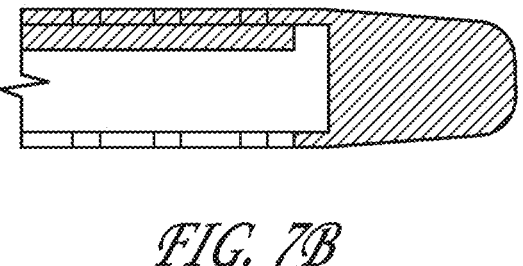
FIG. 7B is a cross-sectional view of the exemplary cheek retractor portion of FIG. 7A.

The cheek retractor portion 130 is illustrated as a hammerhead distal region, which may be attached to the main body portion 110. FIG. 7A is a close-up view of an exemplary cheek retractor portion 130 in an exemplary mouthpiece. FIG. 7B is a cross-sectional view of the exemplary cheek retractor portion 130 of FIG. 7A.

The mouthpiece may be used with a mouth prop 160, as illustrated in FIGS. 1 (with a mouth prop 160) and FIGS. 2 (illustrated without the mouth prop 160). FIGS. 3A-E provide different close-up views of an exemplary mouth prop 160. The removable strap 310 may be attached to portion 320 of mouth prop 160, which may be used to prop open a patient's mouth and teeth. In this regard, the suction connector portion 120 may additionally have an external plug 220 (FIG. 2C) protruding from the posterior side of the suction connector portion 120. Such a plug 220 may correspond to and serve to connect with an opening in the mouth prop 160. The mouth prop 160 may be reinforced by the presence of the plug 220 in the opening, thereby resulting in a more crush-resistant, nearly incompressible, and stable mouth prop 160. In some embodiments, the suction connector portion 120 may further have a cutout 230 (e.g., which may be shaped as a logo) providing extra interlocking with a corresponding protrusion (e.g., which may also be shaped as a logo) on an external high-suction vacuum adapter.

The mouth prop 160 may be made of thickened silicone material injection molded in a single piece with an elastic strap corresponding to the circumference of the suction connector portion. The mouth prop 160 has an internal, rectangular-shaped female slot designed to fit snugly with the external, rectangular-shaped male plug 220 of the suction connector portion 120 of the mouthpiece. Mouth props may be made in different sizes for differently sized mouths. Because the mouth prop and mouthpiece are detachable from each other, different sizes of each may be mixed and matched as needed for a particular patient's mouth.

The mouthpiece as described herein may be used with a one-piece, autoclavable, high-suction vacuum adapter. Such a high-suction vacuum body adapter may be made of a single homogenous material. Having a single lever design, such a vacuum adapter may function in the same manner as all the current high-suction vacuum evacuators and saliva ejectors in controlling the removal of water, saliva, and debris from the oral cavity to the outside vacuum source. The single lever may be designed to control the removal of water, saliva, and debris from the at least partially enclosed so main body through a single, large evacuation conduit within the suction connector portion.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A mouthpiece for use with a suction system to remove fluids from a mouth of a patient during a dental procedure, comprising:
   a suction connector portion for connection to the suction system;
   a main body having a first end and a second end that is narrower than the first end, the first end being adjacent to the suction connector portion, the main body comprising:
       a first wall that extends from the first end to the second end, the first wall including a plurality of first edges,
       a second wall that extends from the first end to the second end, the second wall including a plurality of second edges, wherein the second wall includes an interior surface that faces an interior space between the first wall and the second wall, and wherein a plurality of crests of a wave-like structure is formed on the interior surface of the second wall with a trough between adjacent ones of the plurality of crests, the plurality of crests providing a plurality of contact points with the first wall such that the plurality of troughs form a plurality of gaps through which the fluids can pass as the fluids move toward the suction connector portion of the mouthpiece, wherein the plurality of contact points are unattached to the first wall; and
       a third wall that connects one of the first edges of the first wall to one of the second edges of the second wall; and
   a cheek retractor portion extending from the second end and connected to the first wall and the second wall of the main body.

2. The mouthpiece of claim 1, wherein the suction connector portion includes an evacuation conduit, the evacuation conduit being in communication with the interior space between the first wall and the second wall.

3. The mouthpiece of claim 2, wherein the suction connector portion includes a mouth prop.

4. The mouthpiece of claim 3, wherein the mouth prop includes a first side and a second side that are inwardly tapered from a top surface of the mouth prop towards a bottom surface of the mouth prop, the first side and the second side each including a plurality of ridges.

5. The mouthpiece of claim 4, wherein the suction connector portion further includes a cutout configured to interlock with a corresponding protrusion associated with the suction system, the cutout having a generally triangular shape or a shield shape.

6. The mouthpiece of claim 1, further comprising a stability bar corresponding to a thickened area of the main body, the stability bar extending along a longitudinal axis of the main body between the first wall and the second wall, wherein a thickness of the stability bar reinforces at least a portion of the main body.

7. The mouthpiece of claim 1, wherein the second wall includes a first plurality of perforations that are distributed along one of the second edges, and a second plurality of perforations that are distributed along an opposing one of the second edges.

8. The mouthpiece of claim 7, wherein the main body includes a transition region that transitions into the cheek retractor portion, the cheek retractor portion being wider than the transition region.

9. The mouthpiece of claim 8, wherein the transition region is rectangular in shape.

10. The mouthpiece of claim 8, wherein at least one of the first plurality of perforations and at least one of the second plurality of perforations is located on the transition region near the cheek retractor portion.

11. The mouthpiece of claim 10, wherein five of the first plurality of perforations and five of the second plurality of perforations are located on the main body outside of the transition region.

12. The mouthpiece of claim 11, further including a stability bar corresponding to a thickened area of the main body, the stability bar extending along a longitudinal axis of the main body.

13. The mouthpiece of claim 12, wherein the stability bar extends from the second wall toward the first wall.

14. The mouthpiece of claim 12, wherein the stability bar does not contact the first wall.

15. The mouthpiece of claim 1, wherein the first wall and the second wall of the main body transition into the cheek retractor portion, the first wall and the second wall being spaced apart from each other for a distance within the cheek retractor portion before being connected to each other in the cheek retractor portion.

16. A mouthpiece for use with a suction system to remove fluids from a mouth of a patient during a dental procedure, comprising:

a suction connector portion for connection to the suction system, the suction connector portion includes an evacuation conduit, the suction connector portion further including a mouth prop with a first side and a second side, the first side and the second side each including a plurality of ridges;

a main body having a first end and a second end that is narrower than the first end, the first end being adjacent to the suction connector portion, the main body comprising:

a first wall that extends from the first end to the second end, the first wall including a plurality of first edges, a second wall that extends from the first end to the second end, the second wall including a plurality of second edges, the second wall including a first plurality of perforations that are distributed along one of the plurality of second edges, the second wall includes an interior surface that faces an interior space between the first wall and the second wall, the interior surface including a wave-like structure having a plurality of crests and a plurality of troughs, the plurality of crests providing a plurality of contact points with the first wall, the plurality of troughs forming a plurality of gaps through which the fluids may flow, and a third wall that connects one of the first edges of the first wall to one of the second edges of the second wall; and a cheek retractor portion extending from the second end of the main body and connected to the first wall and the second wall of the main body;

wherein the fluids from the patient flow into the plurality of perforations and through the plurality of gaps within the interior space between the first and second walls before entering the evacuation conduit of the suction connector portion.

17. The mouthpiece of claim 16, further including a stability bar corresponding to a thickened area of the main body, the stability bar extending along a longitudinal axis of the main body between the first wall and the second wall.

18. The mouthpiece of claim 17, wherein the stability bar extends from the second wall toward the first wall, and wherein the stability bar does not contact the second wall.

19. The mouthpiece of claim 16 wherein the suction connector portion includes a mouth prop, the mouth prop includes a first side and a second side that are inwardly tapered from a top surface of the mouth prop towards a bottom surface of the mouth prop, the first side and the second side each including a plurality of ridges.

20. The mouthpiece of claim 16, wherein the suction connector portion further includes a cutout configured to interlock with a corresponding protrusion associated with the suction system, the cutout having a generally triangular shape or a shield shape.

* * * * *